United States Patent Office 3,403,015
Patented Sept. 24, 1968

3,403,015
METHOD OF TREATING GLASSWARE
Everett F. Grubb, Friedrich W. Hammer, and Joseph R. Monks, Toledo, Ohio, assignors to Owens-Illinois, Inc., a corporation of Ohio
No Drawing. Filed May 25, 1965, Ser. No. 458,780
8 Claims. (Cl. 65—29)

ABSTRACT OF THE DISCLOSURE

A method for determining the extent to which a transparent metallic oxide coating has been applied to a sodium-containing glass surface comprising exposing the glass surface to a lithium containing bath at temperatures below about 400° C. and thereby producing a pattern on that portion of the glass surface which has not been provided with a metallic oxide coating.

---

The present invention relates to the glassware industry and treatments of glass surfaces to improve the qualities of the glassware. In its more particular aspects, the present invention relates to a method for evaluating and controlling the application of protective coatings to glassware for the purpose of improving the durability and scratch resistance of the glassware.

Glass derives its principal strength from an unblemished surface and any scratches or flaws which are present on the surface considerably decreases its strength; reductions in strength to as little as one-quarter of the original value not being uncommon. Maximum strength of glass articles is usually attained shortly after they are formed but because of the abrasion and scratching which occurs as a result of the articles coming in contact with each other and other surfaces, the strength is rapidly diminished. In the course of handling, packing and shipping, glassware articles frequently abrade, thereby producing scratches and mars on the surfaces. This problem is particularly acute in the food and beverage field wherein glass containers are subjected to various processing cycles. Bottles in contact with each other move on conveyor belts and are successively filled with the contents, closed and packaged for delivery. In these operations the bottles frequently come into contact with each other as well as mechanical equipment. Many times the bottles are also subjected to washing, sterilizing or vacuum treatments depending upon the particular products with which they are filled.

During each of these operations, the bottles continuously come in contact with each other and as they move from station to station, the chances of abrasion and surface scratches, mars and flaws increases. Reduction in strength of the bottles results from these abrasions. Breakage of bottles during these operations, particularly after the bottles are filled, represents additional problems to processors and adds to the total cost of the operations. To minimize the scratching and abrading of the glass surfaces during the manufacturing and processing operations, various attempts have been made in the past to coat the exterior glass surface with compositions to protect the surfaces or reduce the abrasion and scratching. Many such coatings have been developed and among the most successful of these are thin, transparent, colorless metallic oxide coatings. These metallic oxide coatings have been found to impart excellent scratch and abrasion resistance properties to glassware so as to materially reduce the breakage and thereby effecting a substantial reduction in the cost of the total operation.

Containers coated with compositions having good scratch resistance and abrasion resistance properties, particularly those which have good properties when the surfaces are either wet or dry and can be handled more rapidly in the filling and packaging apparatus and can be spaced closer together therefore increasing the speed of the conveyors and making for a more efficient operation. Even though the glassware may be subjected to more contacts, such metallic oxide coatings afford sufficient protection.

The coatings produced by the above described methods result in a tightly adherent, thin, invisible metallic oxide coating which imparts superior wet and dry scratch resistance and abrasion resistance to the glass surfaces.

Among the most satisfactory of the compounds that have been used in this connection are titanium-, zirconium-, vanadium- and tin-containing compounds which are pyrolyzable; i.e., chemically decomposed by the action of heat, to form oxides of the metal on the glass surfaces while the surface is at a temperature above the pyrolyzing temperature of the compound. The compounds are generally applied to the surface of the bottle or jar, tumbler, sheet, glass or the like very soon after the glass article leaves the glass forming machine and either prior to, or, as the glassware is being conveyed to the annealing lehr. A solution of the metal-containing compound is most conveniently sprayed onto the exterior surface of the glassware while the glass is at a temperature at least equal to the pyrolyzing temperature of the metal compound. Generally, the range of temperature necessary to pyrolyze the compound ranges up to about 1300° F. although lower temperatures can be used.

Particularly suitable for this purpose are the titanium-containing compounds which, upon contact with the heated glass surfaces, react to form a substantially colorless, thin, transparent layer or coating of titanium oxide, primarily $TiO_2$. This layer or coating of $TiO_2$ tightly adheres to the surface of the glass and can have an average thickness of up to about 1 micron, preferably less than 1 micron.

Most suitable among the titanium compounds are the volatile metallo-organic compounds such as the alkyl titanates, preferably where the alkyl group has from 1 to 8 carbon atoms. Examples of such compounds are: tetrabutyl titanate, tetraisopropyl titanate, tetraethylhexyl titanate and the like. Other suitable titanium containing compounds are the titanium tetrahalides, particularly titanium tetrachloride. Ammonium salts of titanium lactate are also suitable.

In accordance with the above described methods, the metallo compound may be used alone to form the metallic oxide coating on the glassware or, if desired, a second or overcoat may be applied thereto which generally takes the form of a lubricious material such as a wax, fatty material, low molecular weight polymers and other natural and synthetic materials. Particularly suitable are partially oxidized low molecular weight polyethylenes having a molecular weight of approximately 1200 to 2000 and an acid number of 14 to 17.

When glass containers are treated in accordance with the foregoing as described in the art, the glass surfaces are rendered scratch resistant and abrasion resistant and have exhibited markedly improved properties over untreated control samples. However, due to the variation in the manner of application of the coatings or due to faulty spraying apparatus or improper adjustment of spraying apparatus and the like, occasionally a large number of glass containers are sent through the entire treatment operation, filled with the contents, if any, and packaged without having a proper coating applied thereto. This is manifested by a sharp increase in breakage for the lot. Poor adjustment of spraying equipment or apparatus results in a lack of uniformity in the coating or an insufficient amount of the coating or a spotty coating which, because the coating is invisible and cannot be readily seen, cannot be readily detected early enough for remedying the situation.

Various attempts have been made to insure that the proper coating is applied by carefully adjusting spraying equipment. However, all such attempts have not proved to be entirely satisfactory inasmuch as visual inspection of specimens is insufficient because of the invisible nature of the coating. Therefore, it has been extremely difficult to exercise quality control over the application of scratch resistant coatings to glass surfaces. It would therefore be desirable to develop methods whereby the quality of the scratch resistant coating can be readily determined so that proper control can be exerted over the scratch resistant coating that is applied to large numbers of glassware.

It would be extremely desirable to have an analytic method whereby the uniformity of the scratch resistant coating could be visually ascertained without requiring complex apparatus such as electron microscopes so that if the spraying equipment is not properly functioning to provide a uniform coating, proper corrective measures could be readily instituted to avoid the loss of the entire lot of glassware moving through the treating operation into the annealing lehr. Techniques have not heretofore been available to ascertain the adequacy of an invisible coating on the surface of glassware.

Accordingly, it is an object of the present invention to provide a method for determining and controlling the quality of scratch resistant and abrasion resistant coatings on glassware.

It is a further object of the present invention to provide a method for exercising quality control over the application of scratch resistant coatings on glassware so as to insure uniformity of coatings and to avoid the shortcomings and disadvantages of the prior methods of obtaining protective coatings on glass surfaces.

It is a further object of the present invention to provide a method for determining by visual methods the extent to which glass surfaces have been coated with invisible metallic oxide protective coatings.

It is a further object of the present invention to enable evaluation and quality control of the transparent coating on protectively coated glassware.

It is a further object of the present invention to provide a method to improve the properties of the glassware which avoids the shortcomings of prior known methods and compositions.

In attaining the above objects, one feature of the present invention resides in a method for improving and controlling the quality of and determining the adequacy of invisible metallic oxide coatings on glassware surfaces. The glassware is treated shortly after the ware leaves the glass forming machine and while the glassware is at a temperature above the strain temperature and below the deformation temperature of the glass with a metal-containing compound that pyrolyzes upon contact with the hot glass surface to form a thin, invisible metallic oxide coating on the said glass surface, and thereafter the glass surface that has applied thereto the metallic oxide coating is contacted with a molten salt bath treatment to thereby render visible any portion of the glass surface which has an inadequate or incomplete coating of metallic oxide thereon.

A further feature of the present invention resides in a method for evaluating the completeness and adequacy of a scratch resistant coating on glassware having been treated by applying a pyrolyzable organo-metallic compound to the surface of glassware which chemically decomposes by the action of heat to form a thin invisible layer of metallic oxide on the surface of the glass while the surface is at a temperature at or above the pyrolyzing temperature of the metallo-organic compound, which method comprises contacting the treated glass surface with a molten salt bath containing an ion exchangeable for a different ion of the glass, and whereby an ion exchange reaction takes place on any uncoated glass surface. As a result any inadequately coated surface will be rendered visible thereby permitting a visual inspection to ascertain the quality and completeness of the scratch resistant coating, and further permitting immediate corrective steps to be taken if necessary.

Another feature of the present invention resides in applying to a glass surface having been treated with a pyrolyzable metal compound and having formed thereon an invisible metallic oxide coating, a molten lithium salt bath containing an ion exchangeable for the sodium ion in any uncoated glass surface so as to render visible that portion of the glass surface which does not have applied thereto a protective scratch resistant coating and thus permit rapid and visual determination of the adequacy and quality of said coating.

Other objects, features and advantages of the present invention will become apparent from a detailed description thereof hereinafter.

In carrying out the present invention, glass surfaces of an article of manufacture, such as a bottle, jar tumbler, sheet glass and the like is treated with a pyrolyzable compound soon after the article leaves the glass forming machine and as it is being conveyed to the annealing lehr. A solution of the pyrolyzable metallo-compound is most conveniently sprayed onto the exterior surfaces of the glass article while the glass surface is at a temperature at least equal to the pyrolyzing temperature of the compound. Generally, the temperature of the shaped glassware as it leaves the glass forming machine is such that it is above the pyrolyzing temperature of the compounds applied thereto. The range of temperatures necessary to pyrolyze metallic compounds such as the titanium-containing compounds is from about 700° F. to 1300° F. depending upon the particular compound used. The above ranges of temperature will vary considerably depending on the compounds used. Although these coatings are generally applied to the exterior they can be applied to the interior with equally satisfactory results.

The present invention is particularly valuable in that it provides an extremely efficient method for determining the quality, uniformity and adequacy of the transparent scratch resistant coatings that are applied to glass surfaces. Thus, the present invention enables the manufacturer of glassware to keep a close control over the quality of the goods and to reduce the cost of losses due to breakage caused by poor application of the scratch resistant coating.

Owing to the essentially invisible nature of the metallic oxide film, lack of uniformity and poor coating of the glassware has, heretofore, not been readily detectable at an early stage to permit remedial measures to be instituted. Inadequate coatings would only be detected by virtue of the large breakage and excessive cost of any particular lot or shipment. At that stage it was, of course, too late to remedy the situation and an entire lot of the glass articles would be ruined because of their high susceptibility to scratching and ultimately, breaking. Inspection by other complex methods such as electron microscope is not feasible.

The present invention will thus enable the manufacturer of glass articles, and particularly glass containers, to sample at random the treated glass articles to determine whether the spraying apparatus is achieving a satisfactory coating on the glassware. The manner in which the control is effected is by producing a visible pattern on that portion of the glass surface of the articles that has not been satisfactorily coated with the prospective coating. In the method of the present invention the properly coated glass surface remains essentially invisisble and the improperly or uncoated surface of the glass is rendered susceptible to a particular chemical reaction whereby the uncoated surface of the glass may readily be observed.

After the glassware has been treated with the metallic compound to provide a transparent metallic oxide coating on the surface of the glass the glass is contacted with a molten salt bath at elevated temperature for a sufficient period of time to permit an ion exchange between a selected ion in the molten salt bath and a different ion, usually sodium which is present in the surface of the glass, but the ion exchange takes place only in that area which does not have applied thereto a satisfactory protective coating. The ion exchange reaction will render visible the area unprotected by the metallic oxide coating which will then be immediately observable and indicate an unsatisfactory application of the protective coating. Thereafter, proper adjustments can immediately be carried out on the spraying apparatus, angle of spray nozzle, concentration, and the like so as to remedy the situation and attain a more uniform application of the metallic compound to produce a satisfactory metallic oxide protective coating on the glassware. This process will thus enable a considerable saving of glassware.

It is to be understood that in addition to the application of the metallic compound to form the protective coating, one or more additional protective coatings can be applied to the glassware prior to carrying out the step of contacting the glassware with the molten salt bath. Such overcoating materials may conveniently be natural and synthetic polymers and resins, waxes and the like.

The molten salt baths useful for purposes of the present invention contain a salt of lithium, preferably lithium nitrate and may contain a salt compatible therewith such as potassium nitrate or sodium nitrate. The preferred salt bath composition consists of 5–40 mole percent $LiNO_3$ and 60–95 mole percent $KNO_3$ or $NaNO_3$. As the mole percent of $LiNO_3$ decreases the temperature of the treatment must be correspondingly increased. Generally, the glass surface is at elevated temperatures when contacted with the molten salt bath. For example, the glass surface can be heated to a temperature between the melting point of the bath and the decomposition point of the bath for a period of time varying from about 5 minutes to 2 hours. Examples of this range of temperature are about 175° C. and 400° C., respectively. The time of treatment is directly proportional to temperature, such that, for example, a 50° C. increased temperature of the treatment reduces treatment period by about 1/10 the time of treatment period at the lower temperature. The molten salt bath preferably contains at least about 5–20 mole percent lithium nitrate. Generally, the treated glass surface is washed with water and then neutralized by immersion in a suitable acid such as 5% hydrofluoric acid solution for a short period of time; for example, 4 to 5 minutes. The glass surface that has not been adequately protected by the metallic oxide coating will have formed thereon a visible pattern in the form of a fine fog or very fine crazing, cracking or hair lines.

It is understood that various other metallic compounds can be used for the formation of the metallic oxide coating on glass surfaces. Suitable examples of such materials include methyl triethoxysilane, tetrabutyl titanate overcoated with potassium oleate - polyethylene emulsion, numerous zirconium compounds, tin and vanadium compounds capable of pyrolyzing to the oxides. Among the tin compounds are the stannic salts, including stannic halide such as stannic chloride and the stannous salts including stannous halide such as stannous chloride. The stannous salts of monocarboxylic acids having up to about 18 carbon atoms per molecule and particularly, the fatty acid such as stannous oleate, stannous stearate, stannous palmitate and the like. Stannous salts of naphthenic acids and other organic acids are also useful. Other compounds can also be used such as ethyl silicate, methyl borate, butyl borate, isopropyl borate, trimethoxy boroxine, colloidal aluminum hydroxide, colloidal silica and the like.

The following examples will serve to illustrate the present invention without being limiting thereof in any way.

Example I

A tetrabutyl titanate solution consisting of one part by volume of titanate and two parts by volume of anhydrous n-butanol was prepared by dissolving the titanate ester at room temperature in the solvent. The solution thus obtained was sprayed using compressed air and an AGA gun onto the exterior surface of glass bottles at the rate of 1 gallon per hour as they were continuously being conveyed from the bottle forming machine to the annealing lehr. The temperature of the surface was about 1100° F. and the titanate was pyrolyzed almost immediately. A third clear, hard, transparent coating formed upon the surface of the bottles. Thereafter, in order to analyze a portion of the surface that had been protected, the glass bottles, at a temperature of about 250° C. were immersed in a molten salt bath consisting of 40 mole percent $LiNO_3$ and 60 mole percent $KNO_3$. After this treatment, the glass containers were washed in water and immersed in a 5% HF solution for 4 to 5 minutes. None of the bottles exhibited microcracks in the test area showing that a very satisfactory coating had been applied to the glass containers.

Example II

The exact same test procedure was utilized in this example as in Example I with the exception that only the lower half of the bottles were sprayed with the titanate solution. Carrying out the same test procedure, it was immediately observed that the upper portion of the containers had not been protectively coated because of the appearance of a fine system of cracks which represented the areas in which the lithium ion exchanged for the sodium-ion.

The present invention represents a valuable technique for applying metallic oxide coatings by rendering visible those areas which have been improperly coated so as to provide a very efficient and rapid method for analyzing and controlling the quality of protectively coated scratch resistant glassware. It is to be understood that the present invention may be used to check and evaluate other protective coatings.

What is claimed is:

1. A method for determining the extent to which transparent metallic oxide protective coatings are applied to sodium-containing glass surfaces in order to render them scratch and abrasion resistant, and thereby to control the quality of protectively coated glassware, which comprises treating a glass surface while the surface of the glass is at a temperature below the deformation temperature of the glass, with a pyrolyzable metallic compound capable of pyrolyzing on the surface of the hot glass to deposit a tightly adherent, thin, invisible, protective metallic oxide coating on the glass surface whereby the portion of the glass having said protective coating applied thereto is rendered scratch and abrasion resistant, and thereafter contacting the glass surface with a molten salt bath containing a lithium salt at a temperature below about 400° C. wherein the lithium ion exchanges for the sodium ion in the surface of the glass, but only in the areas of the glass which have not been adequately coated with the metallic oxide coating, and thereafter treating the glass surface with water and hydrofluoric acid thereby producing a visible pattern on that portion of the glass surface which has not been provided with metallic oxide coating.

2. The method as defined in claim 1 wherein the pyrolyzable compound is an organo metallic compound.

3. The method as defined in claim 1 wherein the pyrolyzable compound is a member selected from the group consisting of titanium-, zirconium-, tin- and vanadium-containing components.

4. A method as defined in claim 1 wherein the molten bath consists of a mixture of lithium nitrate and material selected from the group consisting of potassium nitrate and sodium nitrate.

5. A method as defined in claim 1 wherein the molten bath consists of 5–40 mole percent LiNO$_3$ and 60–95 mole percent KNO$_3$, NaNO$_3$ and mixtures thereof.

6. A method for determining the completeness and uniformity of a transparent, essentially invisible protective coating that is applied to glassware to render said glassware scratch and abrasion resistant, which comprises contacting said glassware having applied thereto said transparent protective coating, at elevated temperature of at least about 175° C. and less than about 400° C. for a period of time of about 5 minutes to 2 hours with a molten salt bath comprising a lithium inorganic salt, the lithium ion of which is capable of exchanging for sodium ion in the surface of the glassware, but which ion exchange reaction takes place only on those portions of the glassware surface which have not been adequately provided with the protective coating, and thereafter treating the glass surface with water and hydrofluoric acid, said ion exchange reaction producing a visible pattern on those portions of glass surface which have not been satisfactorily treated to impart scratch and abrasion resistance.

7. A method as defined in claim 6 wherein the molten salt bath is a mixture of LiNO$_3$ and material selected from the group consisting of KNO$_3$ and NaNO$_3$.

8. The method as defined in claim 6 wherein the glassware is at a temperature of 250° C. and is in contact with a molten bath consisting of 40 mole percent LiNO$_3$ and 60 mole percent KNO$_3$ for about 20 minutes, and thereafter washed and immersed in a 5% HF solution for about 4 to 5 minutes.

References Cited
UNITED STATES PATENTS

| | | | |
|---|---|---|---|
| 2,779,136 | 1/1957 | Hood et al. | 65—30 |
| 2,098,582 | 11/1937 | Kallus | 65—31 |
| 3,004,863 | 10/1961 | Gray | 65—30 |
| 3,171,768 | 3/1965 | Levengood | 156—24 |
| 3,249,224 | 5/1966 | Uhlig | 65—29 |
| 3,282,770 | 11/1966 | Stookey et al. | 65—31 |
| 3,287,201 | 11/1966 | Chisholm et al. | 65—30 |

DONALL H. SYLVESTER, *Primary Examiner.*

J. H. HARMAN, *Assistant Examiner.*